(No Model.)

J. CHASE.
DISH DRAINER.

No. 503,278. Patented Aug. 15, 1893.

Witnesses
John Pirie
J. A. Rutherford

Inventor
James Chase
By James L. Norris
Attorney

UNITED STATES PATENT OFFICE.

JAMES CHASE, OF ROCHESTER, NEW YORK.

DISH-DRAINER.

SPECIFICATION forming part of Letters Patent No. 503,278, dated August 15, 1893.

Application filed September 15, 1892. Serial No. 445,998. (No model.)

*To all whom it may concern:*

Be it known that I, JAMES CHASE, a citizen of the United States, residing at Rochester, in the county of Monroe and State of New York, have invented new and useful Improvements in Dish-Drainers, of which the following is a specification.

My invention relates to dish-drainers, and the object thereof is to provide a novel simple and comparatively inexpensive construction whereby dishes may be drained in the rinsing pan and the cutlery separated from the dishes; the drainer being so formed that it is capable, also, of use as a grating device, a steamer, a strainer, a heater for food used in the sick-room, or a fruit dish, as well as other purposes too evident to require mention.

To accomplish this object my invention consists in the specific features of construction hereinafter described and claimed, reference being made to the accompanying drawings, in which—

Figure 1:
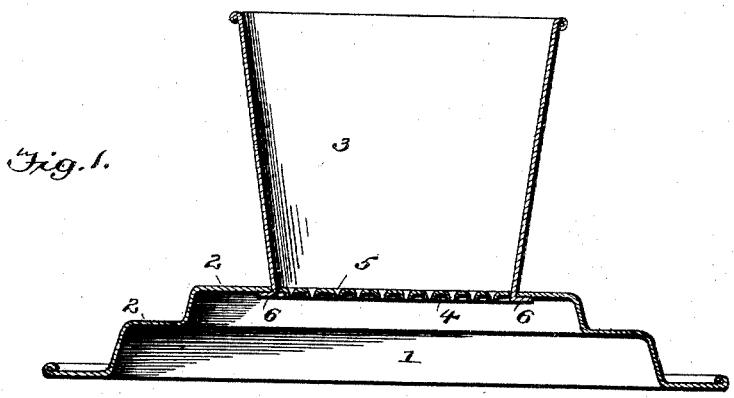
Figure 2:
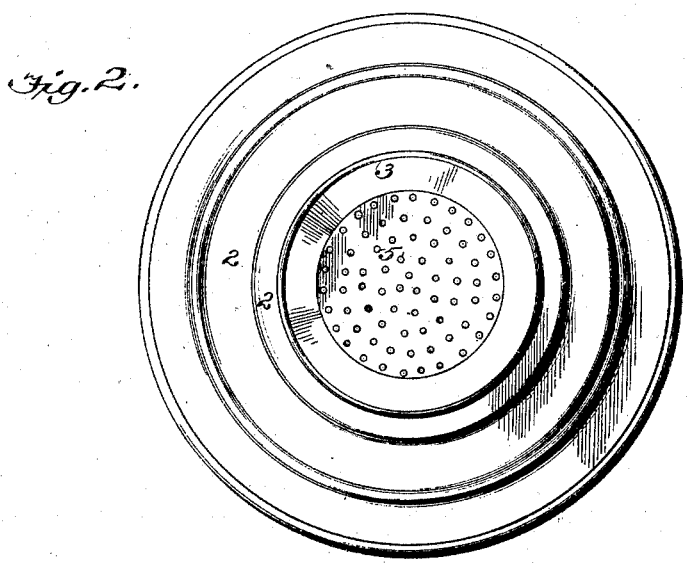
Figure 3:
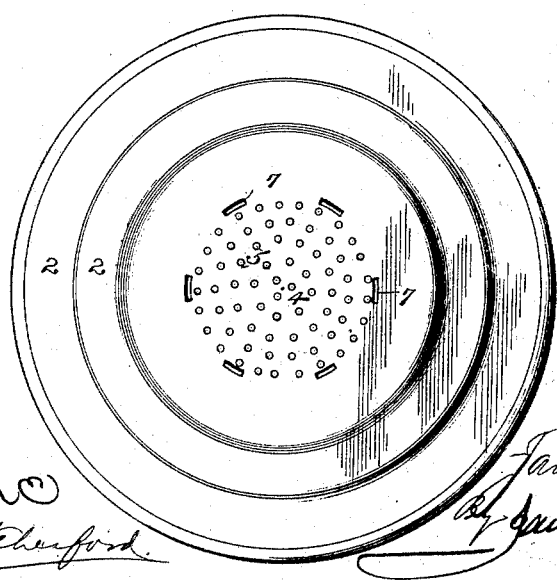

Figure 1, is a vertical sectional view of a dish drainer constructed according to my invention. Fig. 2, is a top plan view of the same, and Fig. 3, is a detail top plan view of the base piece.

In order to enable those skilled in the art to make and use my invention I will now describe the same in detail, referring to the drawings wherein—

The numeral 1 indicates a base piece of substantially circular form, constructed of sheet metal, and provided with successive ledges or steps 2, of any suitable number, the base being formed by striking the sheet metal blank up in a die. The steps or ledges 2, form successive annular surfaces, rising one above another, and of successively decreasing diameter.

Centrally mounted upon the base 1, is a rim or receptacle 3, of either cylindrical shape or, if preferred, of slightly greater diameter at the upper open end than at the bottom. The central portion of the base piece is perforated with numerous openings 5, which are struck with a punch in such manner that the under surface of the bottom 4, presents the appearance of and is susceptible of being used as a grater.

Upon the lower edge of the receptacle 3, is formed a series of projecting lugs or tongue pieces 6, which are made to pass through slots or openings 7 in the base and are then bent laterally to fasten the parts together. By this method of attachment no solder is required to connect the base and receptacle together, and said parts may be readily nested together for transportation, thereby saving much space and greatly promoting the convenience of the shipper as well as the safety of the articles.

The drainer is used by placing it within the rinsing pan and resting the edges of the dishes upon the steps or ledges 2, while the cutlery, spoons and other similar articles are placed within the receptacle 3, from which the water drains through the perforated bottom 4.

The device may also be used as a strainer, and in connection with an ordinary spirit lamp, it forms a convenient apparatus for heating food in a sick-room.

The perforated bottom 4, of the receptacle 3, is well adapted for use as a grater, and the entire device can be used as a steamer, if inverted.

The implement provides a novel, simple, economical and efficient dish drainer which is also susceptible of being used for many other purposes as before indicated.

What I claim is—

1. A dish drainer, consisting of a base piece 1 having successive ledges or steps 2, and a central portion 4 formed with perforations 5, which are struck downward to provide a grater at the under side of the base piece, and a rim or receptacle 3 having its lower edge secured to the stepped base piece outside the perforated grater portion thereof, substantially as described.

2. A dish drainer, consisting of a base piece 1, having successive ledges or steps 2, slots 7, and a central portion 4, formed with perforations 5, struck downward to provide a grater at the under side of the base piece, and a rim or receptacle 3 having tongue pieces 6, extending through the slots in the base piece and bent laterally, substantially as described.

In testimony whereof I have hereunto set my hand and affixed my seal in the presence of two subscribing witnesses.

JAMES CHASE. [L. S.]

Witnesses:
JOHN L. SAGE,
WM. C. LOWREY.